(12) United States Patent
Allison

(10) Patent No.: US 12,716,695 B2
(45) Date of Patent: Aug. 25, 2026

(54) HIGH ENERGY LASER DEFENSE WEAPON SYSTEM WITH AUTOMATED UAS DETECTION AND CLASSIFICATION FUNCTIONALITY

(71) Applicant: David Benjamin Allison, Owens Cross Roads, AL (US)

(72) Inventor: David Benjamin Allison, Owens Cross Roads, AL (US)

(73) Assignee: KORD Technologies LLC, Huntsville, AL (US)

( * ) Notice: Subject to any disclaimer, the term of this patent is extended or adjusted under 35 U.S.C. 154(b) by 0 days.

(21) Appl. No.: 19/098,779

(22) Filed: Apr. 2, 2025

(65) Prior Publication Data

US 2026/0016268 A1 Jan. 15, 2026

Related U.S. Application Data

(63) Continuation of application No. 18/482,604, filed on Oct. 6, 2023, now Pat. No. 12,281,880.

(60) Provisional application No. 63/413,770, filed on Oct. 6, 2022.

(51) Int. Cl.

| | |
|---|---|
| ***F41H 13/00*** | (2006.01) |
| ***F41H 11/02*** | (2006.01) |
| *G02B 26/08* | (2006.01) |
| *G02B 27/14* | (2006.01) |

(52) U.S. Cl.

CPC ......... *F41H 13/0062* (2013.01); *F41H 11/02* (2013.01); *G02B 26/0816* (2013.01); *G02B 27/14* (2013.01)

(58) Field of Classification Search

CPC .... F41H 13/0062; F41H 11/02; F41H 13/005; G02B 26/0816; G02B 27/14

See application file for complete search history.

(56) References Cited

U.S. PATENT DOCUMENTS

| | | | | |
|---|---|---|---|---|
| 7,030,383 | B2 * | 4/2006 | Babayoff | G03H 1/32 250/370.08 |
| 8,826,582 | B2 * | 9/2014 | Bowman | F41G 1/545 42/115 |
| 10,145,639 | B2 * | 12/2018 | Lung | F41A 27/18 |
| 10,704,874 | B2 * | 7/2020 | Lotan | F41G 7/226 |
| 11,982,509 | B2 * | 5/2024 | Bigby | F41G 1/35 |
| 2006/0197013 | A1 * | 9/2006 | Liebman | G01S 7/48 250/234 |
| 2007/0206177 | A1 * | 9/2007 | Anschel | F41H 13/0056 356/28 |
| 2013/0133239 | A1 * | 5/2013 | Bowman | F41G 1/393 42/115 |

(Continued)

FOREIGN PATENT DOCUMENTS

WO 2021140321 A1 7/2021

OTHER PUBLICATIONS

Patent Cooperation Treaty, PCT International Search Report and Written Opinion dated Oct. 21, 2024 for International Application No. PCT/US2023/076258 filed Oct. 6, 2023; 15 pages.

*Primary Examiner* — Michael D David
(74) *Attorney, Agent, or Firm* — Gary Machetta

(57) ABSTRACT

A high energy laser (HEL) weapon system for counter-UAS (C-UAS) use comprises a fully self-contained laser system including a power supply, thermal management, high-capacity batteries, and integrated radar and electronic warfare subsystems.

21 Claims, 11 Drawing Sheets

(56) References Cited

U.S. PATENT DOCUMENTS

| | | | | |
|---|---|---|---|---|
| 2017/0115086 | A1* | 4/2017 | Lung | F41A 27/18 |
| 2019/0063881 | A1* | 2/2019 | Abramov | B64U 70/92 |
| 2020/0007232 | A1* | 1/2020 | Cahoy | B64G 1/2221 |
| 2021/0091854 | A1* | 3/2021 | Uyeno | G02B 26/0833 |
| 2021/0151948 | A1* | 5/2021 | Paul | H01S 3/139 |
| 2022/0163296 | A1* | 5/2022 | Lavine | G01S 17/66 |
| 2023/0228531 | A1* | 7/2023 | Bigby | F41G 1/35<br>42/117 |
| 2024/0118059 | A1* | 4/2024 | Allison | F41H 13/0062 |

* cited by examiner

HIGH ENERGY LASER DEFENSE WEAPON SYSTEM WITH AUTOMATED UAS DETECTION AND CLASSIFICATION FUNCTIONALITY

CROSS-REFERENCE TO RELATED APPLICATIONS

This application is a continuation of U.S. Application Ser. No. 18/482,604 filed Oct. 6, 2023, which claims benefit of U.S. Provisional Application No. 63/413,770, filed Oct. 6, 2022, entitled HIGH ENERGY LASER DEFENSE WEAPON SYSTEM WITH AUTOMATED UAS DETECTION AND CLASSIFICATION FUNCTIONALITY, the specifications of which are incorporated by reference herein in their entirety.

TECHNICAL FIELD

The following disclosure relates generally to weapon systems for defense against unmanned aircraft systems (UAS) and more particularly to high energy laser (HEL) weapon systems for counter UAS (C-UAS) use featuring automated UAS detection and classification functionality.

BACKGROUND

Hostile or undesired events across the globe remind us that real-world threats can be found around practically every corner. And with the spread of small, low-cost-yet-capable unmanned aircraft systems (UAS), the U.S. government and private sector need a quick and sophisticated way to identify, classify, and destroy any asymmetric threats to forward positions and key infrastructure.

A need therefore exists for a HEL weapon system that can be used for counter-UAS (C-UAS) defense. In particular, a need therefore exists for a HEL C-UAS weapon system with capabilities that can aid a vast array of civilian, commercial, government and military operational scenarios and locations, to include, military bases, convoys, airports, VIP protection, outdoor venues, high-value targets, and key infrastructure and facilities.

SUMMARY

The following disclosure is directed to a high-energy laser (HEL) weapon system for C-UAS defense. The system can be used for civilian, commercial, government and military operational scenarios and locations, including military bases, convoys, airports, VIP protection, outdoor venues, high-value targets, and key infrastructure and facilities.

In one embodiment thereof, a HEL weapon system comprises a 10 kW or 20 kW laser system. In some embodiments, the system uses a scalable HEL architecture.

In another embodiment thereof, the HEL weapon system comprises a fully self-contained laser system including a power supply, thermal management, high-capacity batteries, and integrated radar and electronic warfare subsystems with significantly reduced size, weight and power, as well as cost affordability.

In yet another embodiment thereof, the HEL weapon system provides area protection by advanced artificial intelligence (AI) detection and tracking algorithms which enable the operators to successfully detect, track, intercept and defeat incoming UAS threats at standoff ranges.

In still another embodiment thereof, the HEL weapon system leverages a proven technical approach by employing subsystem hardware technology, complex weapon system-level integration, integrated support equipment, and a command, control, and communication system (C3S).

In another aspect, a HEL weapon system packages the subsystems into a modular Line Replacement Unit (LRU) design with open interfaces to maximize reliability, maintainability, transportability, and ease of upgradability.

In yet another aspect, a HEL weapon system includes an extended magazine depth and long continuous laser on-time.

In still another aspect, a sensor payload of the HEL weapon system has an independent camera system to enhance target tracking effectiveness at extended ranges.

In one embodiment thereof, the laser payload of the HEL weapon system includes a simplified optical design for ease of use and is detachable for maintenance and transportability.

In a further aspect, a HEL weapon system provides impressive flexibility and counter unmanned air systems (C-UAS) employment options in fixed, semi-fixed, and mobile configurations.

In another aspect, a HEL weapon system is designed to easily and cost-effectively integrate with a limitless range of civilian and military vehicles or containers, which enables customers to arrange and employ the systems in a stand-alone setup or with multiple, integrated systems of the same type.

In one embodiment thereof, the HEL weapon system is palletized. In another embodiment thereof, the system is 463L Pallet compatible.

In yet another aspect, a high energy laser (HEL) weapon system for counter-UAS (C-UAS) use comprises a cabinet, a laser system disposed within the cabinet, a power supply disposed within the cabinet and operatively connected to the laser system, a thermal management subsystem disposed within the cabinet and operatively connected to the laser system, and batteries disposed within the cabinet and operatively connected to the power supply.

In one embodiment, the HEL weapon system further comprises an integrated electronic warfare system including artificial intelligence (AI) detection and tracking algorithms to detect, track, intercept and/or defeat UAS. In other embodiments, the integrated electronic warfare system is not included.

In another embodiment, the integrated electronic warfare system is configured to communicate with an integrated radar subsystem.

In still another embodiment, the integrated radar subsystem is an external radar subsystem.

In yet another embodiment, the HEL weapon system further comprises a beam director assembly operatively mounted to the cabinet, the beam director assembly including a gimbal and a payload assembly. A lower portion of the gimbal is rotatably mounted to the cabinet. The payload assembly is rotatably mounted to an upper portion of the gimbal.

In a further embodiment, the payload assembly includes a laser payload, a visible light (VIS) camera, a short-wavelength infrared (SWIR) camera operable in a range from 0.7 um-1.7 um, and a medium-wavelength (MWIR) camera operable in a range from 3.6 um-4.9 um.

In a still further embodiment, the laser payload is selectively detachable from a remaining portion of the payload assembly for maintenance and transportability.

In a yet further embodiment, the payload assembly further includes a high power target illuminator and an eye-safe laser rangefinder.

In a further aspect, a high energy laser (HEL) weapon system for counter-UAS (C-UAS) use comprises a cabinet and a beam director assembly operatively mounted to the cabinet, the beam director assembly including a gimbal and a payload assembly. A lower portion of the gimbal is rotatably mounted to the cabinet. The payload assembly is rotatably mounted to an upper portion of the gimbal. A laser system is operatively connected to the payload assembly. A power supply is operatively connected to the laser system. A thermal management subsystem is operatively connected to the laser system. Batteries are operatively connected to the power supply.

In one embodiment, the HEL weapon system further comprises an integrated electronic warfare system operatively connected to the laser system and the beam director. The integrated electronic warfare system includes artificial intelligence (AI) detection and tracking algorithms to detect, track, intercept and/or defeat UAS.

In another embodiment, the integrated electronic warfare system is configured to communicate with an integrated radar subsystem.

In a still further aspect, a high energy laser (HEL) weapon system for counter-UAS (C-UAS) use comprises a cabinet and a beam director assembly operatively mounted to the cabinet, the beam director assembly including a gimbal and a payload assembly. A lower portion of the gimbal is rotatably mounted to the cabinet. The payload assembly is rotatably mounted to an upper portion of the gimbal. A laser system is operatively connected to the payload assembly. A power supply is operatively connected to the laser system. A thermal management subsystem is operatively connected to the laser system. An integrated electronic warfare system is operatively connected to the laser system and the beam director assembly. The integrated electronic warfare system includes artificial intelligence (AI) detection and tracking algorithms to detect, track, intercept and/or defeat UAS.

In one embodiment, the payload assembly further comprises a laser payload, a visible light (VIS) camera, a short-wavelength infrared (SWIR) camera operable in a range from 0.7 um-1.7 um, and a medium-wavelength (MWIR) camera operable in a range from 3.6 um-4.9 um. At least one of the VIS camera, SWIR camera and MWIR camera are operatively connected to the integrated electronic warfare system.

In another embodiment, the laser payload is selectively detachable from a remaining portion of the payload assembly for maintenance and transportability.

In still another embodiment, the integrated electronic warfare system is configured to communicate with an integrated radar subsystem.

In yet another embodiment, the integrated radar subsystem comprises a radar subsystem of the HEL weapon system.

In a further embodiment, the radar subsystem of the HEL weapon system comprises a Ka band radar. In other embodiments, the radar subsystem of the HEL weapon system comprises a X band radar. In still other embodiments, the radar subsystem of the HEL weapon system comprises a radar having a different band.

In a still further embodiment, the integrated radar subsystem comprises a command, control and communication (C3S) radar subsystem that is external to the HEL weapon system.

In another aspect, a high energy laser (HEL) weapon system comprises a cabinet and a laser system disposed within the cabinet. The laser system includes a plurality of lasers mounted in a fixed configuration within the cabinet, each respective laser emitting a respective individual laser beam when activated. An electrical system is disposed within the cabinet, the electrical system including an electrical battery containing a quantity of electrical power and a power supply operatively connected to the battery to receive the quantity of electrical power and operatively connected to the laser system to activate the plurality of lasers. The power supply can activate the plurality of lasers without need for an external electrical power source until the quantity of electrical power received from the battery is exhausted. A plurality of optical fibers is provided, each respective optical fiber being attached at a first fiber end to a respective one of the lasers within the cabinet to receive the respective individual laser beam and transmit the respective individual laser beam from the cabinet to a respective second fiber end. A beam director assembly is operatively mounted to the cabinet, the beam director assembly including a gimbal and a payload assembly defining a pointing axis extending therefrom. A lower portion of the gimbal is rotatably mounted to the cabinet and the payload assembly is rotatably mounted to an upper portion of the gimbal such that an orientation of the pointing axis can be selectively changed with two degrees of freedom relative to the cabinet. The payload assembly includes an optical payload module including a first camera having a first optical axis disposed at a first predetermined offset relative to the pointing axis and a laser payload module including a laser combiner, a fast steering mirror and a laser aperture optic. The laser combiner is disposed within the laser payload module and adapted to operatively connect to the respective second fiber ends of the plurality of optical fibers to receive the respective individual laser beams transmitted therethrough and to optically combine the respective individual laser beams into a single output laser beam. The fast steering mirror is disposed within the laser payload module in a predetermined optically aligned arrangement with the laser combiner to receive the single output laser beam from the laser combiner. When not energized by control signals, the fast steering mirror reflects the single output laser beam through the laser aperture optic along a null axis having a second predetermined offset relative to the pointing axis, and when energized by the control signal, reflects the single output laser beam through the laser aperture optic along an aiming axis having a dynamic offset relative to the null axis, wherein the dynamic offset has a magnitude and a direction resulting from the control signals. The laser aperture optic is disposed at a third predetermined offset from the first camera such that the null axis and the aiming axis are always offset from the first optical axis of the first camera.

In still another aspect, a method of aiming a high energy laser (HEL) weapon system, comprising the following steps: establishing a field of view in a digital image frame received from a camera system, wherein a reference point in the digital image frame corresponds in a first predetermined relationship to an optical axis of the camera system; providing a HEL unit including a HEL optical assembly and a HEL fast steering mirror assembly interposed into a laser path of the HEL optical assembly, wherein the HEL laser optical assembly has a pointing axis in a second predetermined relationship to the optical axis of the camera when the HEL fast steering mirror assembly is in a null position; designating a target image in the field of view of the digital image frame; determining an offset distance and an offset direction measured from the reference point to the target image in the digital image frame; producing a steering command input based on the offset distance and the offset direction measured from the reference point to the target image in the digital image frame; providing the steering command input to the HEL fast steering mirror assembly; deflecting the HEL fast steering mirror from the null position to a new position using the steering command input; and wherein deflecting the HEL fast steering mirror from the null position to the new position deflects the pointing axis of the HEL laser optical assembly away from the second predetermined relationship with the optical axis of the camera in the offset direction by an angle proportional to the offset distance.

BRIEF DESCRIPTION OF THE DRAWINGS

For a more complete understanding, reference is now made to the following description taken in conjunction with the accompanying Drawings in which.

DETAILED DESCRIPTION

Figure 1:
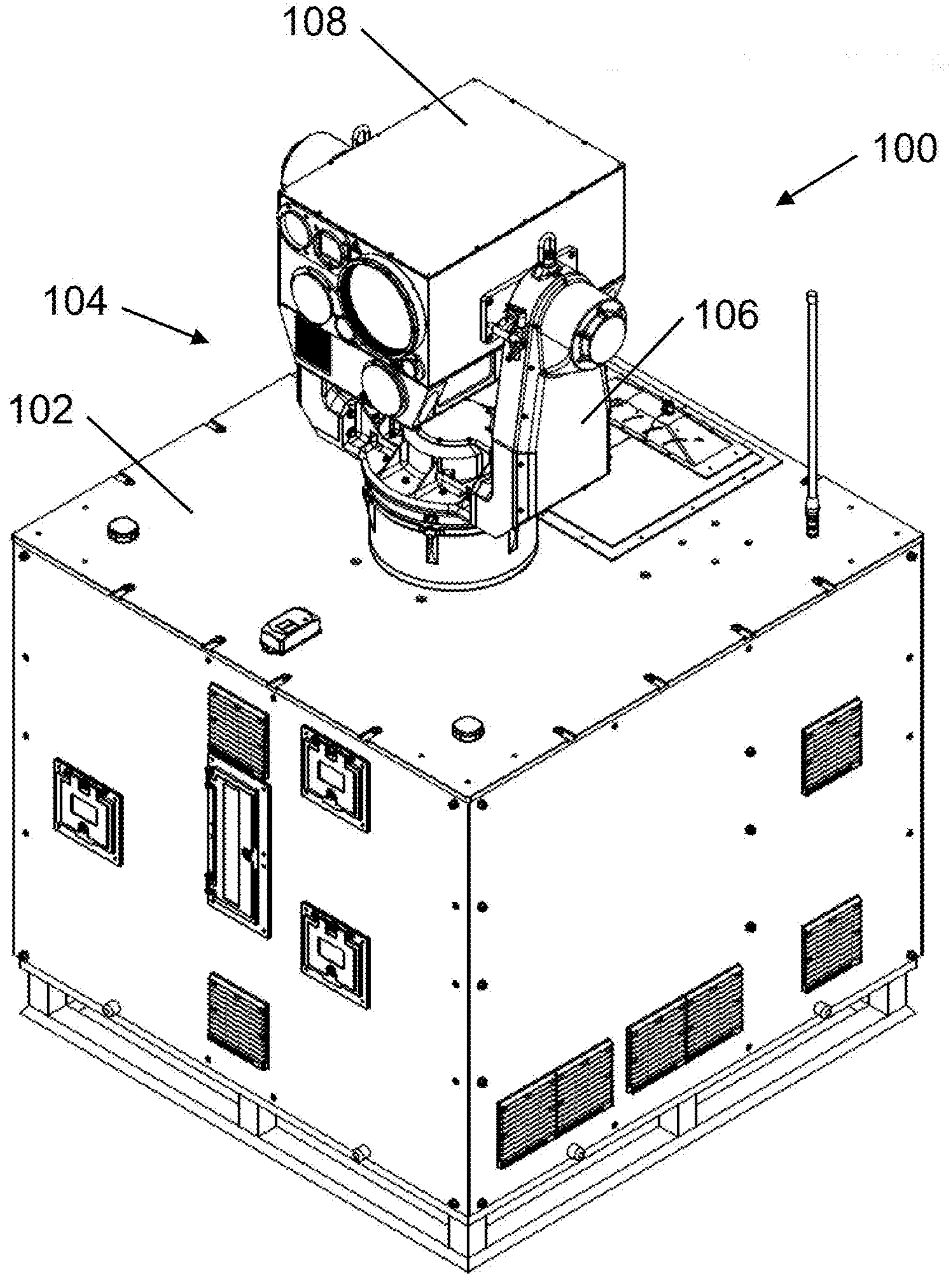
FIG. 1 shows a front view of a high energy laser (HEL) defense weapon system for C-UAS use in accordance with one aspect.

Referring now to FIG. 1, there is illustrated a front view of a high-energy laser (HEL) weapon system 100 for C-UAS defense in accordance with one aspect. The system 100 includes a cabinet 102 upon which is mounted a beam director assembly 104 including a gimbal 106 supporting a payload assembly 108. In some embodiments, the cabinet 102 is palletized or pallet compatible. In some embodiments, the system 100 is 463L pallet compatible. In some embodiments, the system 100 includes modular Line Replacement Unit (LRU) design for multiple configurations.

In some embodiments, the HEL weapon system 100 can comprise a 10 kW or 20 kW laser system. In some embodiments, the system 100 uses a scalable HEL architecture. In some embodiments, the system 100 is a fully self-contained laser system including a power supply, thermal management, high-capacity batteries, and integrated radar and electronic warfare subsystems. In some embodiments, the system 100 provides area protection by advanced artificial intelligence (AI) detection and tracking algorithms which enable the operators to successfully detect, track, intercept and defeat incoming UAS threats at standoff ranges. In some embodiments, the system 100 leverages a proven technical approach by employing subsystem hardware technology, complex weapon system-level integration, integrated support equipment, and a command, control, and communication system (C3S).

In some embodiments, the high energy laser of HEL weapon system 100 can have a power of 10 kW or 20 kW. In some embodiments, the high energy laser of system 100 can have a wavelength of 1030 nm-1080 nm. In some embodiments, the high energy laser of system 100 can have an aperture of 100 mm. In other embodiments, the high energy laser of system 100 can have an aperture of 150 mm for a 20 kW system. In some embodiments, the high energy laser of system 100 can have continuous wave (CW) operation. In some embodiments, the high energy laser of system 100 can be shoot on the pause capable. In some embodiments, the high energy laser of system 100 can have a safety rating of Class IV.

Figure 2:
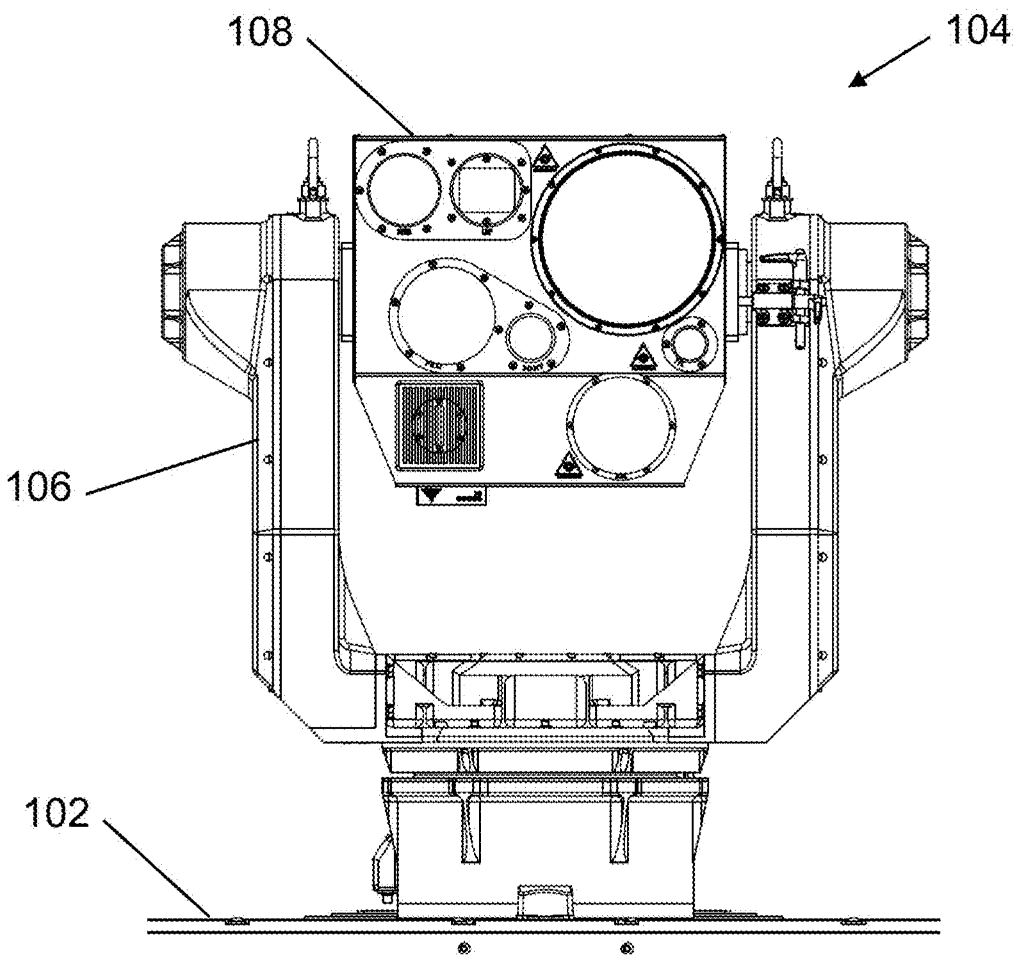
FIG. 2 shows an enlarged front view of the beam director assembly on the HEL weapons system of FIG. 1.

Referring now to FIG. 2, there is illustrated an enlarged front view of the beam director assembly 104 including the gimbal 106 and payload assembly 108 of the HEL weapon system 100. The payload assembly 108 can include a laser payload. In some embodiments, the laser payload of the system 100 has a simplified optical design and is detachable from the payload assembly.

Cameras and optical device can be disposed in the payload assembly 108 of the beam director assembly 104. In some embodiments, the cameras in the payload assembly 108 allow both day and night operation of the HEL weapon system 100. In some embodiments, the cameras in the payload assembly 108 can include a visible light (VIS) camera. In some embodiments, the VIS camera can have a resolution of 1280×1024@100 Hz. In some embodiments, the cameras in the payload assembly 108 can include a short-wavelength infrared (SWIR) camera. In some embodiments, the SWIR camera can operate in the range 0.7 um-1.7 um. In some embodiments, the SWIR camera can have a resolution of 640×512@400 Hz, TEC. In some embodiments, the cameras in the payload assembly 108 can include a medium-wavelength (MWIR) camera. In some embodiments, the MWIR camera can operate in the range 3.6 um-4.9 um. In some embodiments, the MWIR camera can have a resolution of 1280×1024@100 Hz, cooled. In some embodiments, the beam director assembly 104 can have a slew rate of 200 degrees/sec. In some embodiments, the FOR of the beam director assembly 104 can be 360 degrees azimuth, +90 degrees, −45 degrees.

In some embodiments, the payload assembly 108 of the HEL weapon system 100 can include a high power target illuminator. In some embodiments, the payload assembly 108 can include an eye-safe laser rangefinder.

In some embodiments, the HEL weapon system 100 can use AI assisted target recognition. In some embodiments, the system 100 can include radar. In some embodiments, the radar of the system 100 can be Ka band radar. In some embodiments, the system 100 can be compatible with FAAD and MEDUSA command, control and communication systems.

The high energy laser of HEL C-UAS weapon system 100 can include an electrical subsystem. In some embodiments, the electrical subsystem of the system 100 provides a magazine depth of >30 minutes. In some embodiments, the electrical subsystem of the system 100 provides a magazine depth of >40 minutes. In some other embodiments, the electrical subsystem of the system 100 provides a different magazine depth. In some embodiments, the electrical subsystem can charge at 100 A with 3 phase 208 VAC 60 Hz power. The high energy laser of HEL C-UAS weapon system 100 can include a thermal subsystem. In some embodiments, the thermal subsystem of the system 100 can use 30/70 EGW as a working fluid. In some embodiments, the thermal subsystem provides the system 100 with operation temperatures of −20 C to +50 C with full solar. In some embodiments, the thermal subsystem provides the system 100 with storage temperatures of −40 C to +85 C. In some embodiments, the system 100 has environmental (i.e., rain/dust) protection rating of IP56. In some embodiments, the system 100 can have a ADSB external interface. In some embodiments, the system 100 can have a TLE-3 external interface.

In the embodiment shown in FIGS. 1 and 2, the high HEL weapon system 100 comprises the cabinet 102 with a laser system disposed within. A power supply is disposed within the cabinet 102 and operatively connected to the laser system. A thermal management subsystem is disposed within the cabinet 102 and operatively connected to the laser system. Batteries are disposed within the cabinet 102 and operatively connected to the power supply. The illustrated system 100 further comprise a beam director assembly 104 including a gimbal 106 and payload assembly 108. The payload assembly 108 of the illustrated embodiment includes a laser payload that has a simplified optical design and is detachable from the payload assembly, e.g., for maintenance and transportability. The system 100 of the illustrated embodiment further comprises an integrated electronic warfare system operatively connected to the laser system. The integrated electronic warfare system can include artificial intelligence (AI) detection and tracking algorithms to detect, track, intercept and/or defeat UAS. The integrated electronic warfare system is configured to communicate with an integrated radar subsystem. The integrated radar subsystem can be part of the system 100 or it can be an external C3S radar subsystem, for example FAAD or MEDUSA. In some other embodiments, the integrated electronic warfare system is not included. In still other embodiments, the integrated electronic warfare system is not included, but the system 100 in configured for upgrading with an optional integrated electronic warfare system.

Figure 3:
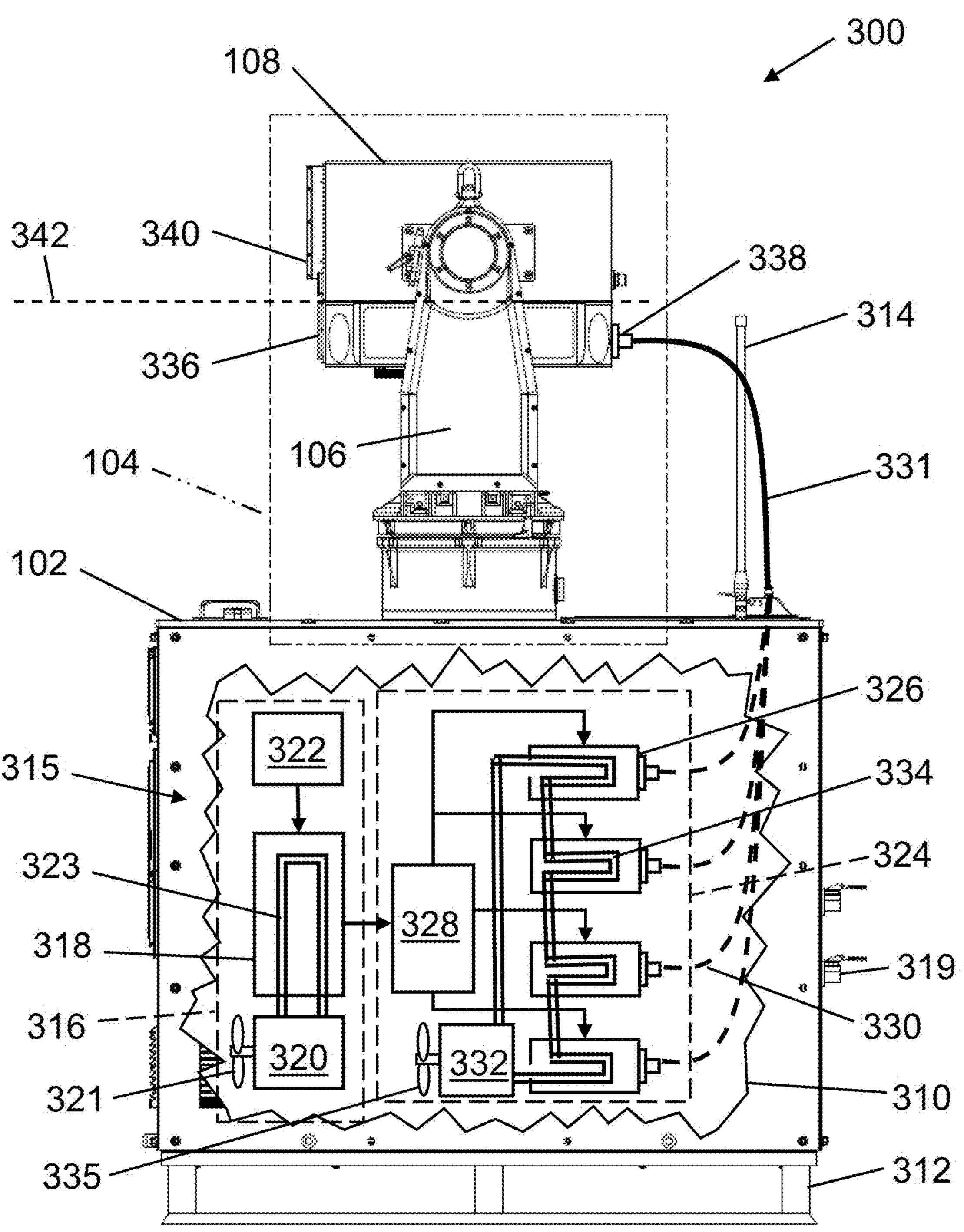
FIG. 3 shows a side view of a high energy laser weapon system (HELWS) in accordance with another aspect, with portions broken away to show interior features.

Referring now to FIG. 3, there is illustrated a HEL weapon system ("HELWS") in accordance with another aspect. HELWS 300 includes a cabinet module 102 having a beam director assembly 104 mounted thereupon. The beam director assembly 104 includes a gimbal 106 mounting a payload assembly 108 and providing at least two degrees of freedom (e.g., azimuth and elevation) for pointing the payload assembly relative to the cabinet module 102. For purposes of illustration, the cabinet module 102 in FIG. 3 has one side wall 310 broken away to show a schematic layout of the interior components. The cabinet module 102 can include a base 312 that is palletized or pallet compatible. In some embodiments, the base 312 and dimensions of the system 300 are 463L pallet compatible.

In some embodiments, one or more detection radar units (not shown) are mounted on the cabinet module 102, preferably arranged to provide coverage in multiple directions around the HELWS 300. In some embodiments, one or more GPS antennas (not shown) are mounted on the cabinet module 102 to provide location information for the system 300. One or more communications and/or data antennas 314 can be mounted on the cabinet module 102 to allow communication and data transfer between multiple HELWS 300 or between the HELWS and command and control systems, which may include, but are not limited to FAAD and MEDUSA systems. In other embodiments, any of the radar detection units, GPS antennas, communications antennas and/or data antennas can be mounted offboard the HELWS 300 and operatively connected to the system.

Referring still to FIG. 3, disposed within the cabinet module 102 of the HELWS 300 is an electrical system 315 including a battery system 316 that can include batteries 318, a first thermal management subsystem 320 (i.e., battery cooling subsystem), and a battery charging subsystem 322. The battery cooling subsystem 320 can include heat exchangers 323 contacting the batteries 318, cooling fans 321 and other components (not shown) including, but not limited to, fluid pumps, radiators and fluid reservoirs to remove heat from the batteries 318 during charging and discharging so as to maintain the batteries within a predetermined temperature range. The battery charging subsystem 322 receives exterior electrical power (e.g., from mains power or from external generators) via external power connections 319 and charges the batteries 318 while maintaining predetermined charge currents and voltages appropriate for their battery chemistry to avoid exceeding the operating ranges of voltage and/or temperature for the batteries. In some embodiments, the battery system 316 of the HELWS 300 can provide a magazine depth of >30 minutes. In some embodiments, the battery system 316 can provide a magazine depth of >40 minutes. In still other embodiments, a different magazine depth can be provided. In some embodiments, the electrical subsystem 315 can charge at 100 A with 3 phase 208 VAC 60 Hz power. It will be appreciated that the layout and positioning of the battery system 316 shown in FIG. 3 is schematic in nature, and that the described components may be shifted or rearranged in different embodiments.

Also disposed within the cabinet module 102 is a laser system 324 including one or more lasers 326 operatively connected to an electrical power supply 328. The power supply 328 is operatively connected to the electrical system 315 to receive electrical power from the batteries 318, convert the electrical input from the batteries to a suitable output voltage and waveform for the lasers, and distribute the converted electrical power to the lasers 326. In some embodiments, a plurality of lasers 326 can be provided and optically combined as described herein to produce a single laser beam that is significantly more powerful than the beam of any single one of the lasers. This combining of the multiple lasers 326 allows the HELWS 300 to produce a relatively higher powered HEL beam output using individually relatively lower powered laser units 326, which arrangement may be cumulatively less expensive than a single HEL unit having the same power of the combined lasers. The lasers 326 can be diode-type lasers, solid-state lasers or gas-type lasers. In some embodiments, the lasers 326 can be diode-pumped diode lasers having continuous wave (CW) operation. In the illustrated embodiment, four lasers 326 are provided, however, different numbers of lasers can be provided in other embodiments. The respective output beam of each laser 326 is delivered into a respective optical fiber 330. In some embodiments having a plurality of lasers 326, some of the plurality of lasers 326 can have a different wavelength and/or polarity from others of the plurality of lasers to facilitate combining of the respective individual laser beams into a single, more powerful HEL beam.

In the illustrated embodiment, the multiple respective optical fibers 330 carrying the respective individual laser outputs from the respective lasers 326 are gathered into a fiber bundle 331, which is routed out of the cabinet module 102 to a laser payload module 336. The laser payload module 336 is part of the payload assembly 108 mounted on the gimbal 106. The optical fibers 330 can enter the laser payload module 336 through a fiber port 338. In the illustrated embodiment, the fiber bundle 331 carrying the respective individual optical fibers 330 exits the upper wall of the cabinet module 102 and then enters the rear wall of the laser payload module 336 through the fiber port 338, however the optical fibers may be routed differently in other embodiments. In the illustrated embodiment, the laser payload module 336 can be selectively attached and detached from an optical payload module 340 that constitutes another portion of the payload assembly 108. In the illustrated embodiment, the division between the optical payload module 340 and the laser payload module 336 is denoted by the dashed line 342, and the optical payload module 340 remains attached to the gimbal 106.

Referring still to FIG. 3, the laser system 324 can include a second thermal management subsystem 332 (i.e., laser cooling subsystem) to remove waste heat from the lasers 326 and other components of the laser system. The laser cooling subsystem 332 can include heat exchangers 334 contacting the lasers 326, cooling fans 335 and other components (not shown) including, but not limited to, fluid pumps, radiators and fluid reservoirs to remove heat from the lasers during operation so as to maintain the lasers within a predetermined temperature range. In some embodiments, the laser cooling subsystem 332 of the HELWS 300 can use 30/70 EGW as a working fluid in the heat exchangers 334. In some embodiments, the laser thermal subsystem 332 provides the HELWS 300 with operation temperatures of −20 C to +50 C with full solar. In some embodiments, the laser thermal subsystem 332 provides the HELWS 300 with storage temperatures of −40 C to +85 C. In some embodiments, the HELWS 300 has environmental (i.e., rain/dust) protection rating of IP56. In some embodiments, the HELWS 300 can have a ADSB external interface. In some embodiments, the HELWS 300 can have a TLE-3 external interface. It will be appreciated that the layout and positioning of the laser system 324 shown in FIG. 3 is schematic in nature, and that the described components may be shifted or rearranged in different embodiments. In addition, in the illustrated embodiment, the battery cooling subsystem 320 and the laser cooling subsystem 332 are separate systems, however, in other embodiments the cooling subsystems 320, 332 can include shared components and/or be subsystems of a larger, common thermal management/cooling system.

Figure 4:
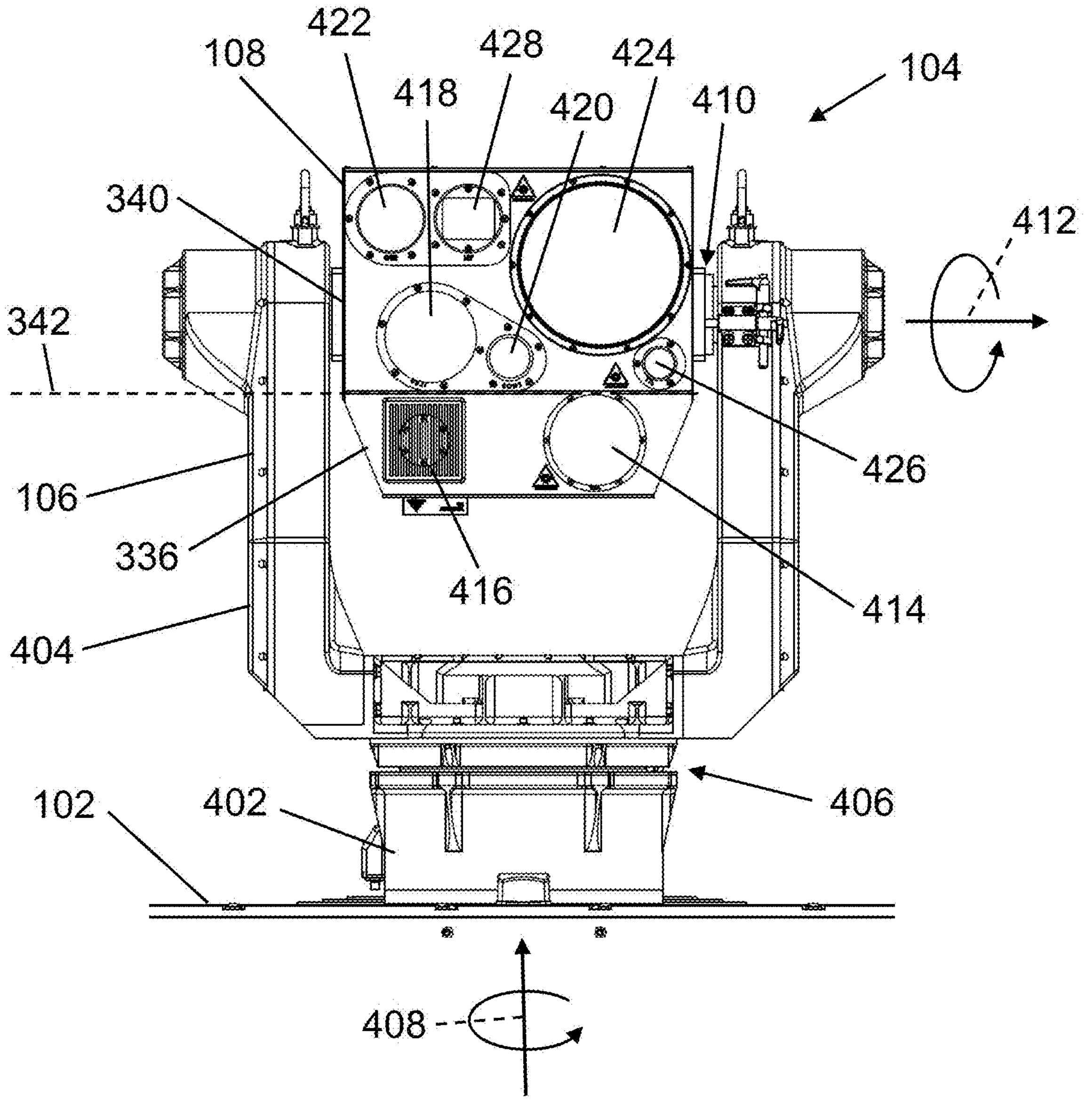
FIG. 4 shows a front view of a beam director assembly of the HELWS system in FIG. 3.

Referring now to FIG. 4, there is illustrated a front view of an aimable beam director assembly 104 mounted on the cabinet module 102 of the HELWS 300. The beam directory assembly 104 includes the payload assembly 108 supported by the gimbal 106. The gimbal 106 includes a gimbal base 402 and a gimble fork 404. The gimbal base 402 is affixed on the upper surface of the cabinet module 102, and the lower portion of the gimbal fork 404 is rotatably connected to the gimbal base at a lower pivot 406, allowing the gimbal fork to rotate around the vertical axis 408. The payload assembly 108 is rotatably connected to the upper portion of the gimbal fork 404 at a pair of upper pivots 410, allowing the payload assembly to rotate around a horizontal axis 412. The lower and upper pivots 406, 410 can be powered by servomotors and controlled by an aiming control system (not shown) of the HELWS 300 to point the payload assembly 108 in any desired azimuth angle (i.e., around the vertical axis 408) and elevation angle (i.e., around horizontal axis 412).

As previously described, the aimable payload assembly 108 includes the optical payload module 340 and the laser payload module 336. The payload assembly 108 is configured so that the optical payload module 340 is directly attached to the gimbal 106 while the laser payload module 336 is not directly attached to the gimbal 106. Instead, the laser payload module 336 is selectively attachable to, and removable from, the optical payload module 340. In some embodiments, the laser payload module 336 is selectively attachable to, and removable from, the optical payload module 340 while the optical payload module remains attached to the gimbal 106. In some embodiments, the laser payload module 336 and the optical payload module 340 are configured such that an specific optical alignment between the laser payload module and the optical payload module is retained after the laser payload module is removed and reattached to the optical payload module. In some embodiments, the laser payload module 336 and the optical payload module 340 are configured such that different laser payloads modules can be successively attached to the same optical payload module 340 without requiring removal of the optical payload from the gimbal. The successively attached different laser payload modules 336 can facilitate field servicing of the HELWS 300, e.g., replacement or upgrade of the laser payload module (e.g., for higher power) or to utilize a HEL with different beam characteristics.

Referring still to FIG. 4, the laser payload module 336 has a HEL aperture optic 414 disposed on its front wall from which the HEL beam is emitted. In some embodiments, one or more ventilation/cooling fans 416 can also be provided for cooling the internal components of the laser payload module 336. As further described, the laser payload module 336 can also include a laser combiner assembly, a laser steering mirror and a laser beam expander, which together serve to produce and steer the HEL beam to be emitted from the HEL aperture optic 414.

The optical payload module 340 includes one or more optical sensors used for tracking and identifying possible targets and for and assisting in aiming the HEL beam emitted from the HEL aperture optic 414 of the adjacent laser payload module 336. The optical sensors can include one or more visible light (VIS) cameras, e.g., a narrow field of view VIS camera 418 and a wide field of view VIS camera 420, a short wavelength infrared (SWIR) camera 422, a medium wavelength infrared (MWIR) camera 424, a high power target illuminator (e.g., target illumination laser, TIL) 426, and an eye-safe laser range finder 428. In some embodiments, one or more VIS cameras 418, 420 can be color cameras producing color image data. In some embodiments, one or more of the cameras 418, 420, 422 and 424 can be commercial off-the-shelf (COTS) camera systems.

As best seen in FIG. 4, the HEL beam produced in the laser payload module 436 is emitted from a separate HEL aperture optic 414 that does not utilize the lenses or optics of the cameras in the optical payload module 340, namely, the VIS cameras 418, 420, SWIR camera 422 and the MWIR camera 424. Thus, the HEL optics and the camera/sensor optics are of non-co-aperture design. This configuration is also known as a “bifurcated” optical system. The use of non-co-aperture/bifurcated configuration is significant because the glass and coatings in the optics of cameras 418, 420, 422 and 424 in the optical payload module 340 can be optimized for the relevant camera operating wavelengths and do not have to be laser transmission compatible (i.e., with additional requirements for transparency or reflectance to laser light wavelengths and/or heat resistance) like the optics needed when sending HEL beams through the camera optics in conventional co-aperture designs. Put another way, the non-co-aperture HEL beam path of the HELWS 300 allows the system to utilize commercial off-the-shelf (COTS) cameras with conventional optics in the optical payload module 340 that have higher performance and/or lower cost than the specialized laser-compatible optics rated for transmitting laser beams of significant power that are required for cameras used in co-aperture system of similar HEL beam power levels.

Figure 5A:
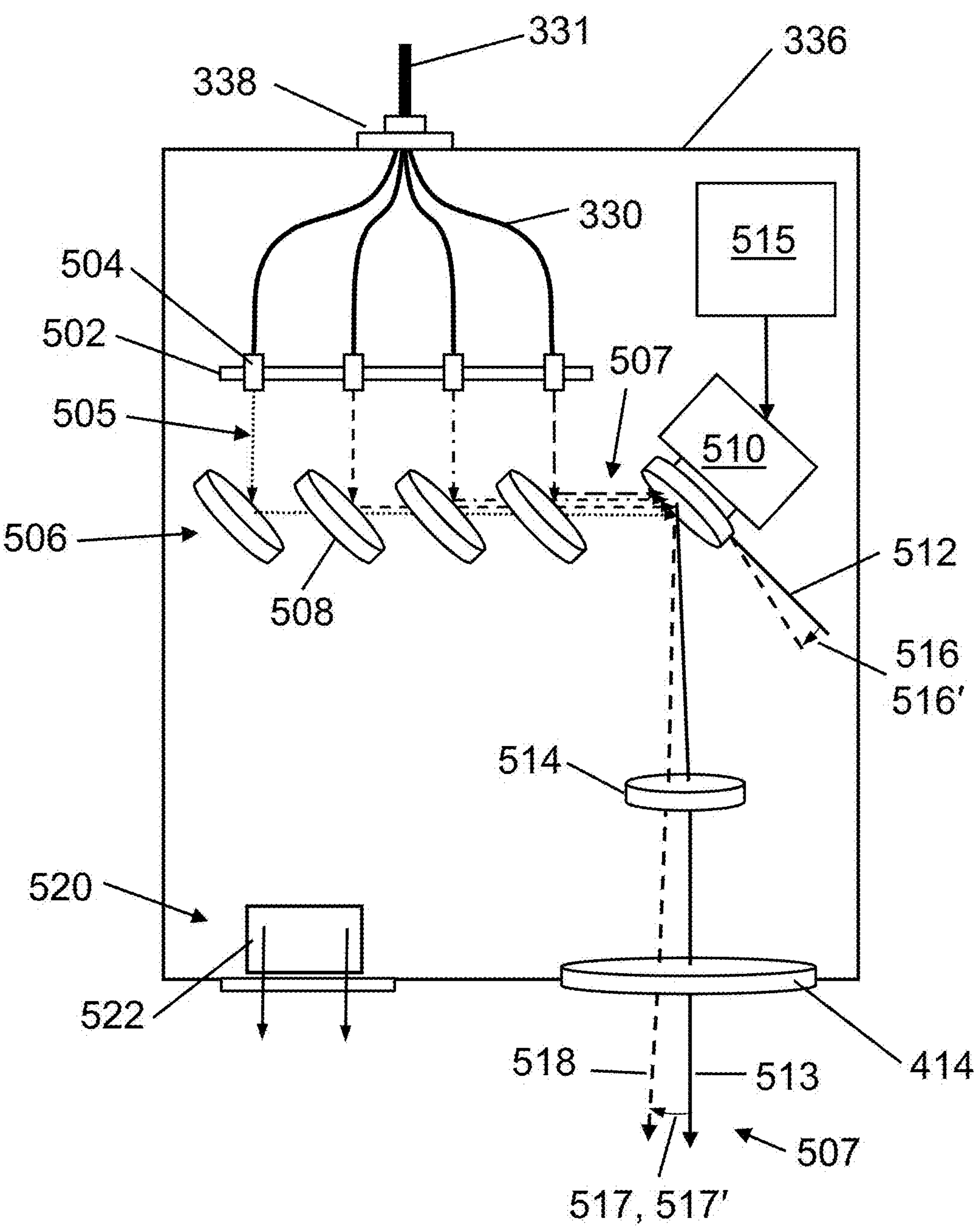
FIG. 5A shows a schematic elevation view one laser payload module of the HELWS.

Referring now to FIG. 5A, the interior components of one embodiment of the laser payload module 336 are illustrated in schematic form. As previously described, the fiber bundle 331, which comprises the collected optical fibers 330 from each laser 326 in the laser system 324, enters the laser payload module 336 through the fiber connector port 338. Once inside the laser payload module 336, the fiber bundle 331 is separated back into the individual optical fibers 330. Each optical fiber 330 is connected into a combiner assembly 502 using terminals, beam expanders or other optical fittings 504 mounted at the end of each optical fiber to emit the individual laser beams 505 in the desired direction. The combiner assembly 502 includes a plurality of combiner elements 506 which are arranged to reflect, refract, transmit, polarize, depolarize or otherwise modify the path and nature of the individual laser beams 505 to combine them into a single HEL beam 507. In the illustrated embodiment, the combiner elements 506 comprise a series of dichroic mirrors 508 mounted in the combiner assembly 502 such that each mirror reflects one laser wavelength while transmitting the other laser wavelengths along an accumulating laser path. Each individual laser beam 505 is thus reflected at the first dichroic mirror 508 when introduced from the optical fiber 330, but then passes through the subsequent dichroic mirrors along the accumulating laser path to cumulatively form a HEL beam 507 at the outlet of the combiner assembly 502. It will be appreciated that the illustrated combiner assembly 502 is just one possible embodiment, and that other embodiments of the HELWS 300 may use different combiner assemblies having different components and/or configurations without departing from the scope of the invention. Further, the layout and positioning of the various components, optics and laser beams shown in the figures is not necessarily to scale, and that the described components may be shifted or rearranged in different embodiments.

After the HEL beam 507 is formed in the combiner assembly 502, the HEL beam can be routed to a fast steering mirror 510. When not energized by control inputs, the fast steering mirror 510 lies in a predetermined null plane 512 and reflects the HEL beam 507 along a predetermined null path 513 (i.e., the null path is predetermined relative to the pointing direction of the beam director assembly 104). In some embodiments, the reflected HEL beam 507 may additionally be routed through additional optics such as a beam expander 514 before exiting the laser payload module 336 through the HEL aperture optic 414. When energized by control inputs from a mirror controller 515, the fast steering mirror 510 can rapidly change its position away from the null plane 512 along multiple axes (e.g., by angles 516, 516' respectively for azimuth angle and elevation angle), thereby rapidly reflecting the HEL beam 507 along a deflected path 518 at angles 517, 517' relative to the original null path 513, where the angles 517, 517' are proportional to the mirror angles 516, 516'. In the illustrated embodiment, the beam deflection angles 517, 517' from the null path 513 are 2× (i.e., two times) the mirror deflection angles 516 and 516'. The fast steering mirror 510 can operate at relatively high speed through the use of piezo technology, voice coil technology or other high speed, high resolution multi-axis movement control.

Figure 5B:
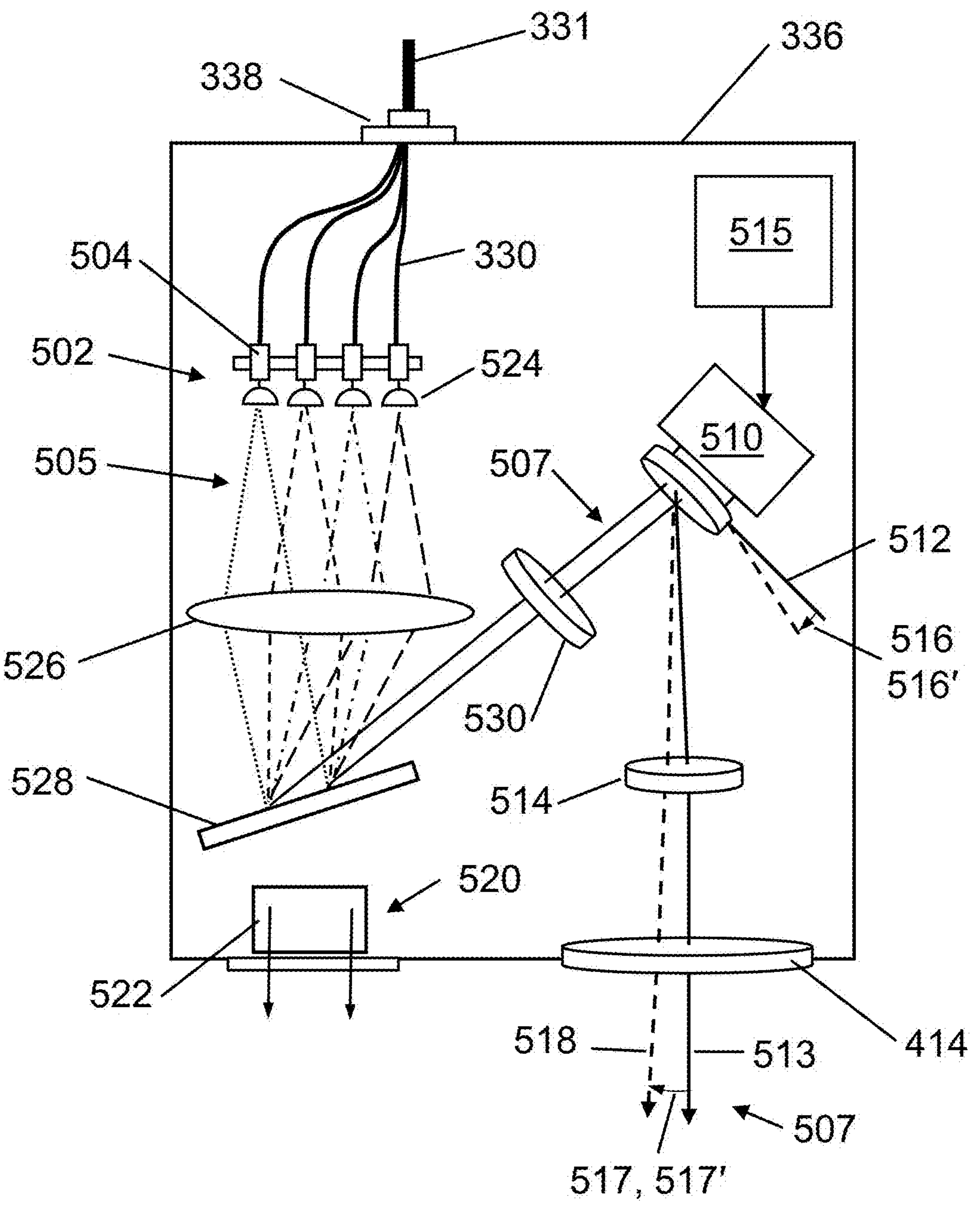
FIG. 5B shows a schematic elevation view of an alternative laser payload module of the HELWS.

Referring now to FIG. 5B, the interior components of an alternative embodiment of the laser payload module 336 are illustrated in schematic form. In this embodiment, the combiner assembly 502 is based on spectral beam combining (SBC). In SBC, each of the respective individual laser beams is incident upon a diffraction grating (which can be reflective or transmissive). For each respective individual laser beam, a different wavelength and angle are chosen such that they obey the grating design and leave aligned, coincident, and parallel with a combined color of all the incident beams, thus creating the output beam. In this embodiment, the fiber bundle 331 enters the laser payload module 336 through the fiber connector port 338 and is separated back into the individual optical fibers 330. Each optical fiber 330 is connected into the combiner assembly 502 as previously described to emit the individual laser beams 505 in the desired direction. Each of the individual laser beams 505 can have a different wavelength. The combiner assembly 502 can include a respective input lens 524 for each respective incoming beam 505, and these input lenses direct the beams onto a common primary lens 526. The primary lens 526 then focuses all of the individual beams onto a diffraction grating 528. In the illustrated embodiment, the diffraction grating 528 is reflective, however, other embodiments can use a transmissive diffraction grating. When the beams from the primary lens 526 become incident on the diffraction grating 528, they have different wavelengths and angles, which are reflected by the diffraction grating according to its design, such that the incident beams leave the grating aligned, coincident, and parallel with a combined color of all the incident beams, thus forming a single output HEL beam 507. In some embodiments, and optical coupler 530 or other optical elements can be provided for the output HEL beam. The output HEL beam 507 is then directed to the fast steering mirror 510 for steering and emission from the laser payload module as previously described.

In some embodiments, the laser payload module 336 further includes a third thermal management/cooling system 520 to remove excess heat generated in the laser payload module 336 during operation of the HELWS 300. In the illustrated embodiment, the cooling system 520 includes one or more cooling elements 522 for removing heat from the interior of the laser payload module 336. In other embodiments, the thermal management system 520 may include fans, heat sinks, radiators and/or other known cooling devices (not shown).

It will be appreciated that the null path 513 of the HEL beam 507 is typically steered/pointed by movement of the beam director assembly 104 relative to the cabinet module 102. This steering/pointing of the beam director assembly 104 is accomplished by rotation of the gimbal 106 at the lower gimbal pivot 406 and rotation of the payload assembly 108 at the upper gimbal pivots 410. Due to the relatively high mass of these elements 106 and 108, the steering/pointing of the beam director assembly 104, and thus the steering/pointing of the null path 513 of the HEL beam, may not be fast enough to successfully engage small, highly maneuverable targets such as drones or other UAS using only mechanical steering/pointing. However, as previously described, the laser payload module 336 of the HELWS 300 can electronically deflect (i.e., steer/point) the HEL beam 507 relative to the null path 513 at very high speed. Accordingly, the HELWS 300 of the current embodiment can achieve very high overall steering of the HEL beam 507 using mechanical steering/pointing of the beam director assembly 104 for coarse aiming and electronic steering/pointing of the fast steering mirror 510 for fine aiming.

Referring now to FIGS. 6A-6E, there is illustrated a control screen for a HELWS in accordance with additional aspects. The control screen 600 can be configured to display a field of view 602 in a digital image frame received from a first camera. The first camera providing the digital image 602 can be any of the cameras in the optical payload module 340, e.g., VIS camera 418, VIS camera 420, SWIR camera 422 or MWIR camera 424. In some embodiments, the digital image 602 may be synthesized by combining the output from several cameras in the optical payload module 340. In some embodiments, the digital image 602 may be synthesized by combining the output from cameras in the optical payload module 340 and external data sources. In some embodiments, the digital image 602 may be further modified by including digital icons generated by the HELWS control system based on system radar and/or data received from external command, control and communications (C3S) assets.

Figure 6A:
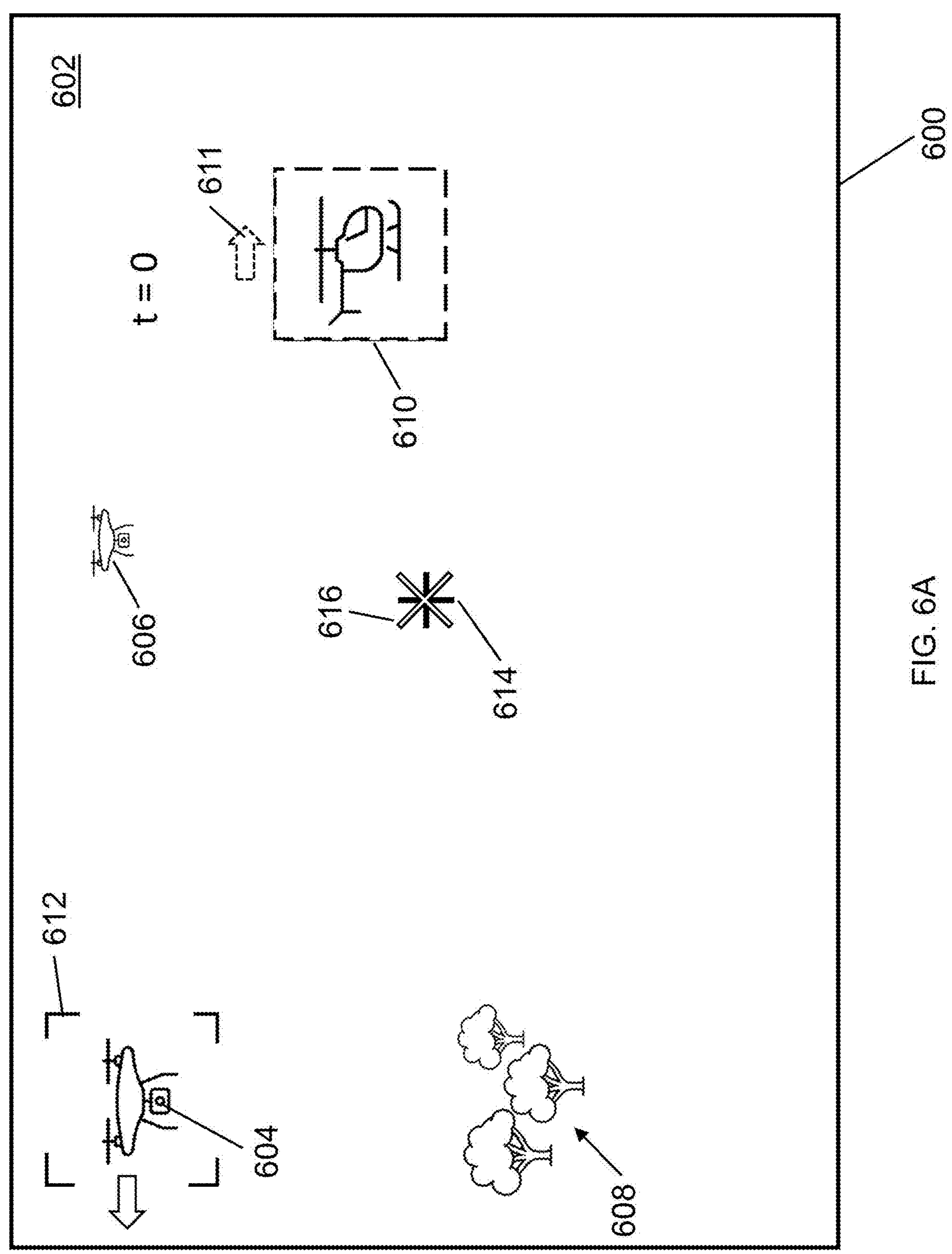
FIGS. 6A-6E show views of a control screen of a HELWS in accordance with further aspects.

In FIG. 6A, the field of view is shown at time t=0, i.e., prior to the designation of a target. The screen display 600 shows images of real objects appearing in the digital image, e.g., a first UAS 604, a second UAS 606 and some natural features, e.g., trees 608. The field of view 602 further includes digital icons (i.e., not appearing in the actual camera feed) created by the control system based on other local or external sensors. In this case a helicopter icon 610 is shown to indicate the assumed position of an aircraft that is not visible in frame (e.g., obscured by terrain or weather). The field of view 602 further includes digital information icons such as image movement vectors 611 and target cue indicator 612 produced by the control system and/or machine vision system. The image movement vector 611 indicates the recent direction of movement of the image relative to the HELWS. The target cue indicator 612 shows the HELWS control system's "suggestion" for a target based on artificial intelligence (AI) threat assessment factors, advisories received from external sources and other considerations. In this case, the UAS 604 is closer than the UAS 606, therefore the AI system suggests the closer UAS for a target by placing the target cue indicator 612 over the actual image. The user can accept the suggested target indicated by the target cue indicator 612 by activating a human machine interface (HMI) comprising another aspect of the HELWS. Alternatively, the user can use the HMI to indicate a different image or icon to designate as a target. In various embodiments, the HMI for the HELWS can be a joystick, touch screen, multi-function controller (e.g., game controller) or other known HMI.

The control screen 600 further shows a first reference point 614 (in this case a "+") in the digital image frame corresponding (in a predetermined relationship) to the pointing axis of the payload assembly. Generally, the first reference point 614 will be along the pointing axis of the payload assembly 340 or along the optical axis of one of the cameras in the payload assembly, but it may be offset from these axes according to predetermined relationships, e.g., to adjust for different locations and/or fields of view of the various sensors in the optical payload assembly 340. The control screen 600 further shows a second reference point 616 (in this case a "x") in the digital image frame corresponding (in a predetermined relationship) to the expected aiming axis 518 of the HEL beam when emitted from the laser payload module 336 payload assembly. When no target is designated, the second reference point 616 (i.e., the expected laser aiming point) can be shown at the same position as the first reference point 614 since the default laser aiming axis 518 is considered the path reflected from the null position of the fast steering mirror 510. Thus, when not engaging a target, the null axis reflection path 513 is approximately aligned (subject to adjustments for predetermined offset relationships) with the pointing axis of the payload module 340.

Figure 6B:
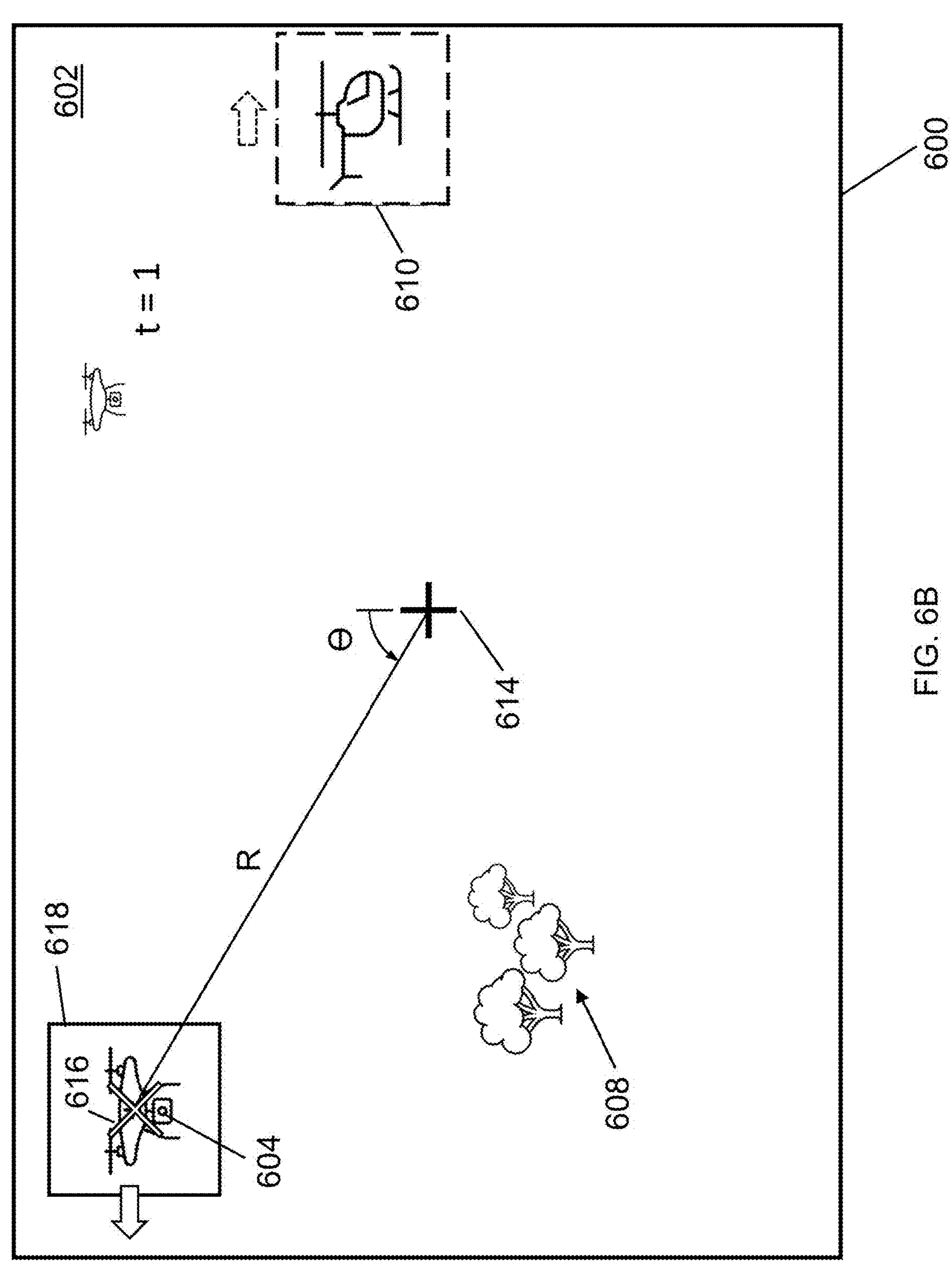

Referring now to FIG. 6B the control screen 600 is shown at the time t=1, i.e., at the time of target designation. In this case, the UAS 604 is selected as the target using the HMI. Once selected, the target cue indicator 612 is replaced by an engaged target indicator 618 placed over the image of UAS 604. Further, HELWS uses its machine vision system to automatically track the image of the selected target across the field of view 602 and keep the engaged target indicator 618 over the perceived center of the selected target. Further, the HELWS uses its control system to move the second reference point 616 over the center of the engaged target indicator 618. Further, the machine vision system of the HELWS determines a first offset distance (denoted "R") and a first offset direction (denoted "⊖") measured from the first reference point 614 to the location of the target image. In some embodiments, the location of the target image used for this measurement can be the center of the engaged target indicator 618. For purposes of illustration, the offset distance R and offset direction ⊖ are shown in FIG. 4B, however, these would not typically appear on the actual control screen image 602.

Once the initial offset distance R and offset direction ⊖ are determined, that information is passed to a gimbal controller, which in turn calculates a gimbal steering command and sends it to the gimbal 106 to move the payload assembly 108 and its pointing axis in a direction corresponding to the current offset direction (i.e., the offset being relative to the current position of the pointing axis). The gimbal controller further sends a gimbal speed command to the gimbal 106 to move the payload assembly at a speed proportional to the current offset distance. As the payload assembly 108 moves, the image 602 provided by the cameras in the optical payload module 340 changes accordingly, and the target image 604 will be seen to move towards the reference point 614 on the control screen as the pointing axis gets closer to the actual target. This process of measuring offsets, sending control commands and moving the gimbal 106 is repeated continuously as the machine vision system tracks the selected target image 604 across the field of view 602 and points the payload assembly 108 to minimize the "error" between the on-screen target image 604 and the first reference point 614.

In some cases, for fast-moving and/or evasive targets, the gimbal's "coarse" tracking movement may be insufficient to put the target image 604 on the first reference point 614 or to keep it there. In other cases, a higher speed of engagement may be desired that is provided by gimbal pointing alone. Therefore, the HELWS has a laser optical pointing system in the laser payload module 336 including a fast steering mirror 510 to provide extremely fast and accurate pointing of the HEL beam relative to the payload assembly 108 itself. This fine tracking of target using the laser payload module 336 is superimposed on the coarse tracking from the gimbal 106. In some embodiments, the HELWS includes a laser control system configured to receive the first offset distance and first offset direction from the machine vision processor. As previously discussed, the laser payload module 336 and the optical payload module 340 do not share common optical paths (i.e., the optical paths are "bifurcated"). Accordingly, there is an offset between each of the respective optical axes of the cameras on the optical payload module 340 and the default (i.e., null) axis of the HEL beam 507 emitted from the laser payload module 336. The offsets between the various camera axes, sensor axes and laser axes can be predetermined and stored in the control system of the HELWS. For convenience in the further description, the optical axes of the various cameras may be considered aligned with the "pointing direction" of the payload assembly 108, however, in reality the specific offsets for each respective camera are used by the actual HELWS. Accordingly, the HELWS includes a laser control system that receives the first offset distance and first offset direction (i.e., both based on the relevant camera optical axis) from the machine vision system. The laser control system then adjusts the first offset distance and the first offset direction according to the predetermined offset relationship between the pointing axis (i.e., the relevant camera axis) and the null axis of the fast steering mirror 512 to produce a modified first offset distance and a modified first offset direction. In some embodiments, the predetermined offset relationship between two axes may also be a function of range-to-target. In such embodiments, the laser control system can determine the range-to-target using the system's laser range finder 428 or other local or external sensors and produce a modified first offset distance and a modified first offset direction that is a function of offset distance, offset direction and range-to-target. The laser control system then sends the modified first offset distance and the modified first offset direction to the mirror controller 515, which outputs control signals to energize the fast steering mirror 510 to reflect the single output HEL beam 507 received from the laser combiner 502 along the aiming axis with a dynamic offset relative to the null axis that has a magnitude and a direction corresponding to the modified first offset distance and the modified first offset direction (and range-to-target, if applicable). Thus, when activated, the optical steering of the laser payload module 336 can send the HEL beam to the screen position indicated by the second reference point 616. It will be appreciated that the fast steering mirror 510 has a limited overall field of motion, thus the coarse steering provided by the gimbal 106 is frequently necessary to keep the target image within the area of the mirror steered laser beam.

Figure 6C:
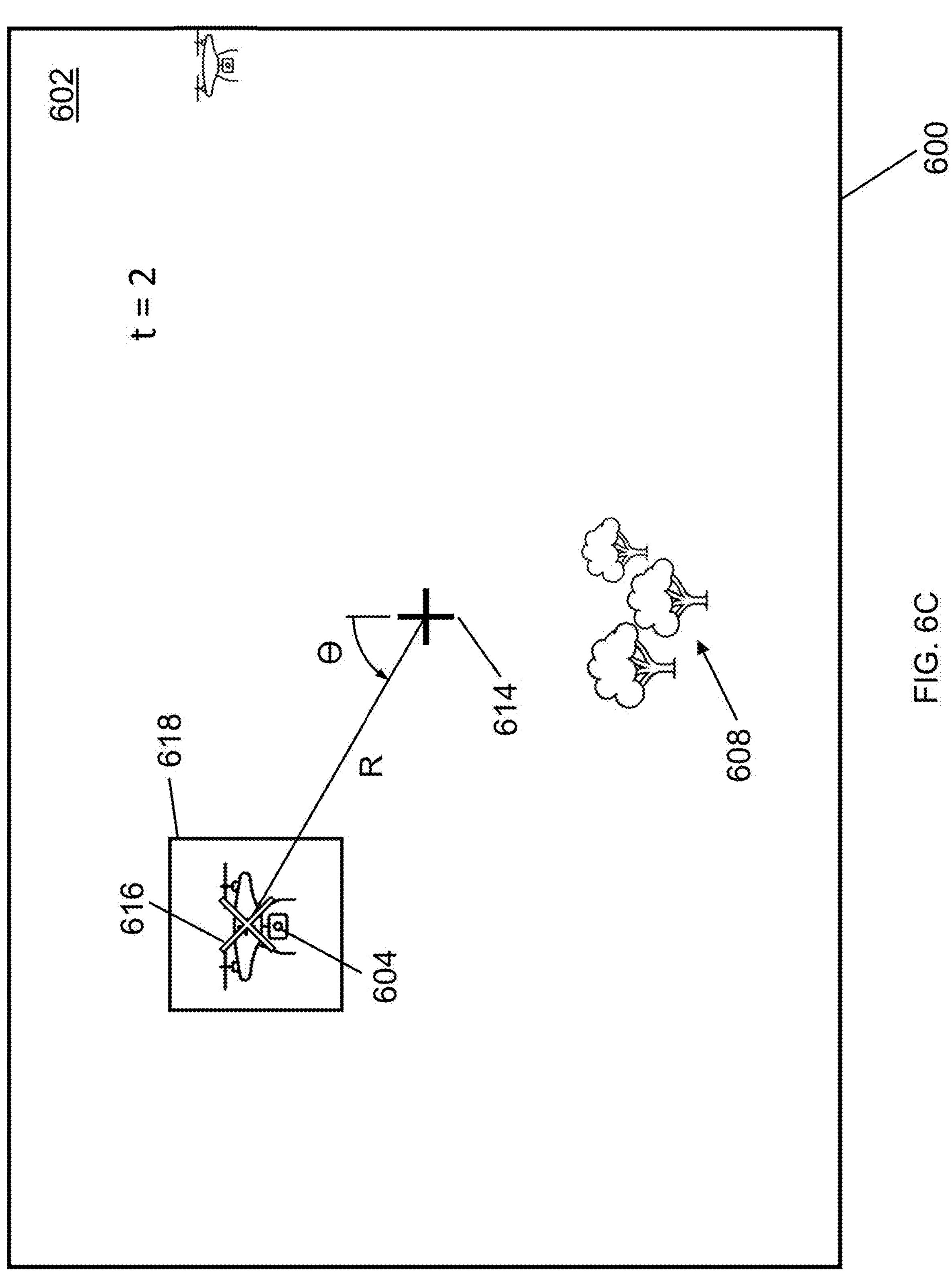

Referring now to FIG. 6C, the control screen 600 is shown at the time t=2, i.e., after the target image 604 has been designated and the gimbal 106 has begun to move the pointing axis towards the target and move the on-screen target image towards the first reference point 614. At this point the target can be engaged using the HMI to activate the laser system 324 and utilize the laser payload module 336 to actively deflect (i.e., steer) the HEL beam 507 from the null axis onto the aiming axis to hit the target with the HEL beam.

Figure 6D:
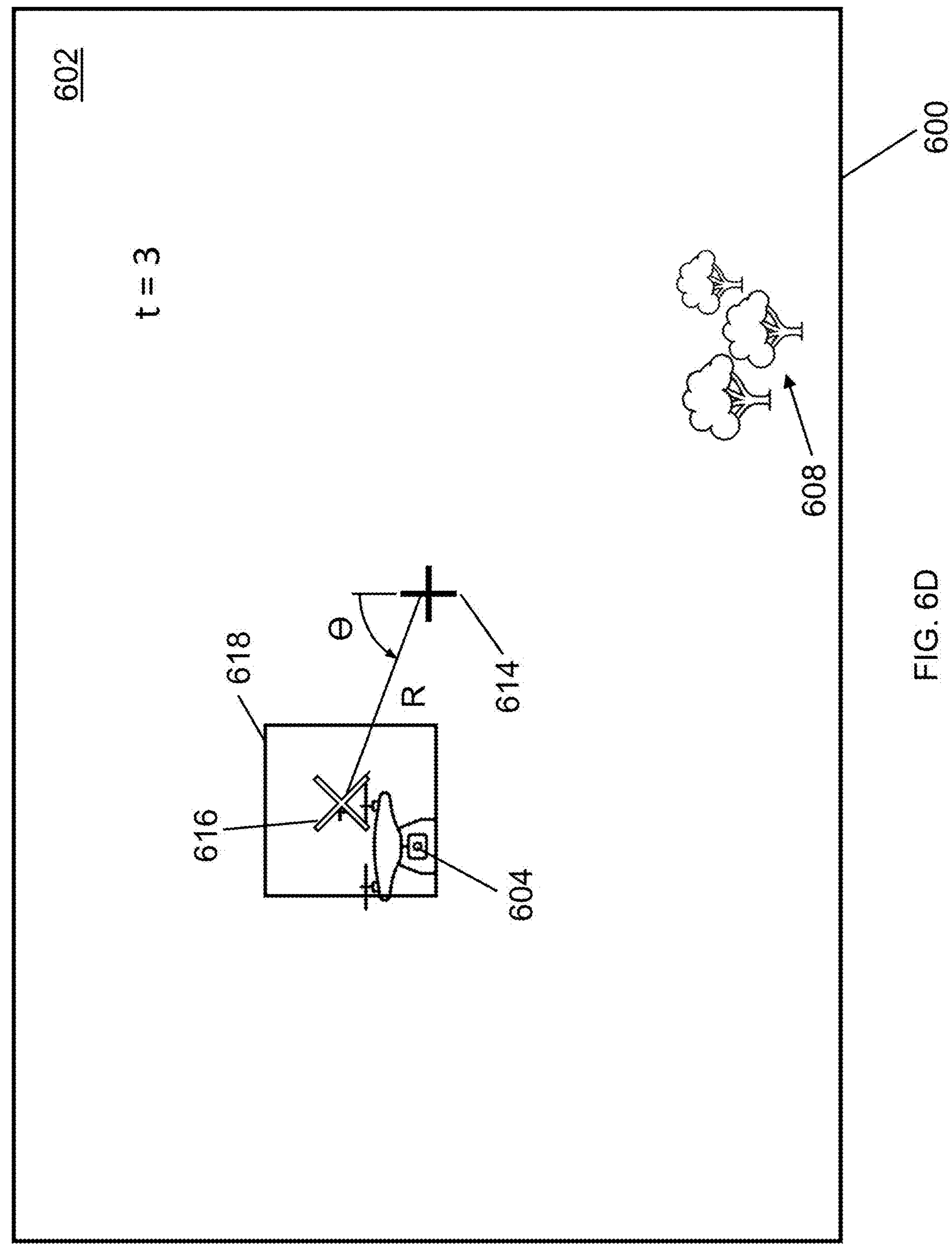

Referring now to FIG. 6D, the control screen 600 is shown at the time t=3, i.e., as the gimbal 106 continues moving the pointing axis towards the target resulting in the on-screen target image 604 continuing to move towards the first reference point 614. In this case however, the target UAS has made a small move downward that remains within the engaged target indicator 618 but is not in the center of the tracking box at the indicated laser aim point 616. If the HEL laser is activated at this point, the HEL beam may miss the target or hit only an extremity.

Figure 6E:
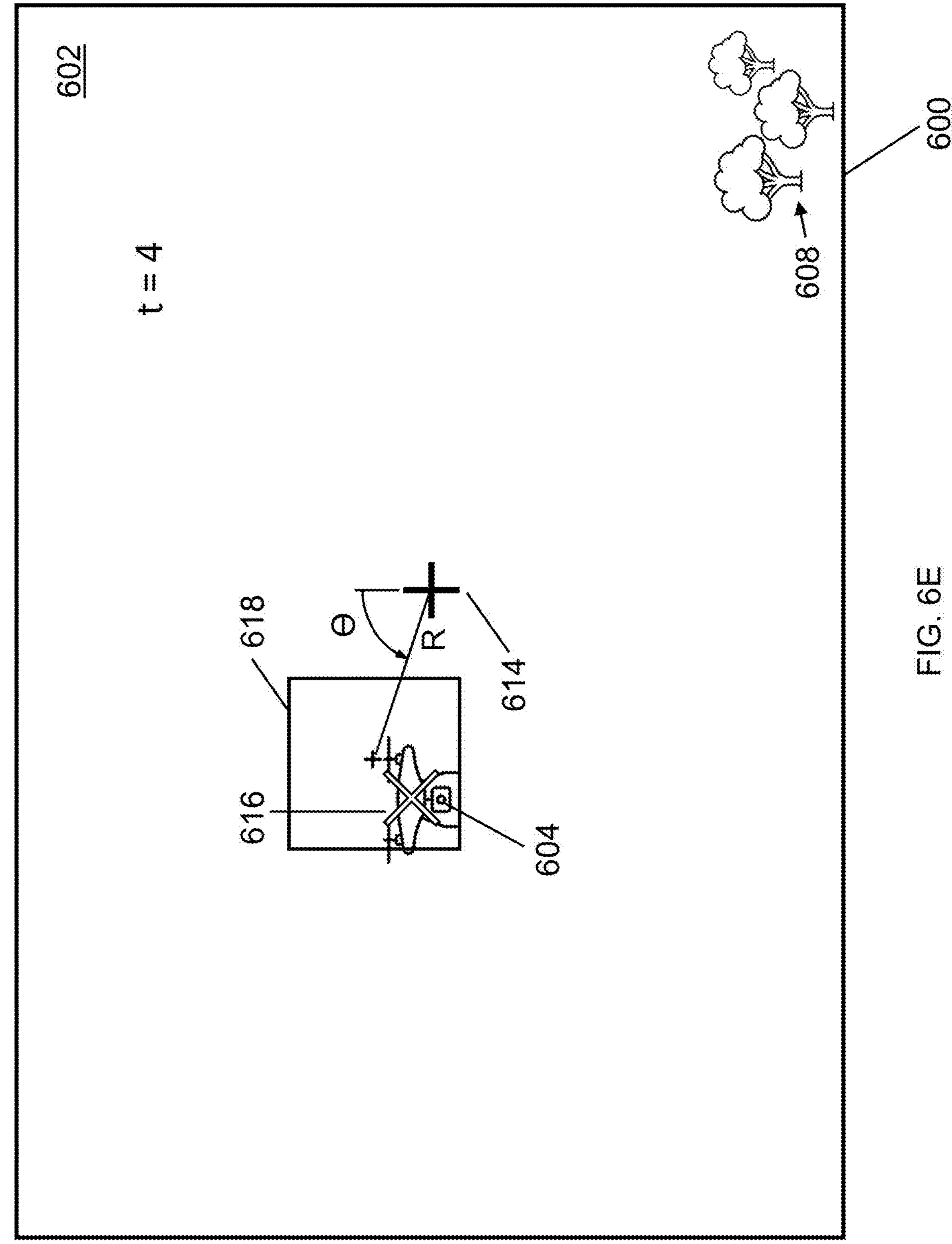

Referring now to FIG. 6E, the control screen 600 is shown at the time t=4, i.e., as the gimbal 106 continues moving the pointing axis even closer to the target resulting in the on-screen target image 604 moving even closer to the first reference point 614. In this case, while the target image 604 has remained in the lower portion of the engaged target indicator 618, the user has utilized the HMI to further adjust the position of the laser aim point 616 within the tracking box so that the laser aim point is now squarely on the target image. At this point the target can be engaged using the HMI to activate the laser system 324 and utilize the laser payload module 336 to actively steer the HEL beam onto the aiming axis to hit the target with the HEL beam.

In still another aspect, a method of aiming a HEL weapon system comprises the following steps:

A. Establishing a field of view in a digital image frame received from a camera system, wherein a reference point in the digital image frame corresponds in a first predetermined relationship to an optical axis of the camera system;

B. Providing a HEL unit including a HEL optical assembly and a HEL fast steering mirror assembly interposed into a laser path of the HEL optical assembly, wherein the HEL laser optical assembly has a pointing axis in a second predetermined relationship to the optical axis of the camera when the HEL fast steering mirror assembly is in a null position;

C. Designating a target image in the field of view of the digital image frame;

D. Determining an offset distance and an offset direction measured from the reference point to the target image in the digital image frame;

E. Producing a steering command input based on the offset distance and the offset direction measured from the reference point to the target image in the digital image frame;

F. Providing the steering command input to the HEL fast steering mirror assembly;

G. Deflecting the HEL fast steering mirror from the null position to a new position using the steering command input; and H. Wherein deflecting the HEL fast steering mirror from the null position to the new position deflects the pointing axis of the HEL optical assembly away from the second predetermined relationship with the optical axis of the camera in the offset direction by an angle proportional to the offset distance.

Although the preferred embodiment has been described in detail, it should be understood that various changes, substitutions and alterations can be made therein without departing from the spirit and scope of the invention as defined by the appended claims.

What is claimed is:

1. A high energy laser (HEL) weapon system comprising:

a cabinet;

a gimbal comprising first portion and a second portion, the first portion rotatably mounted to the cabinet; and a payload assembly rotatably mounted to the second portion of the gimbal, the payload assembly comprising:

an HEL optical assembly and a HEL fast steering mirror assembly disposed in a first predetermined optically aligned arrangement with one another; and a first camera and a second camera disposed in a second predetermined optically aligned arrangement with one another and each respective camera having a respective camera optical element, wherein, a pointing axis defined by the payload assembly can be selectively reoriented relative to the cabinet, and wherein, when not energized by control signals, the HEL fast steering mirror reflects an output HEL beam along a null axis having a predetermined offset relative to the pointing axis.

2. The HEL weapon system of claim 1, the payload assembly further comprising a laser payload module and an optical payload module, the laser payload module being selectively attachable and detachable from a remaining portion of the payload assembly while the remaining portion is attached to the gimbal.

3. The HEL weapon system of claim 2, further comprising:

a laser system disposed within the cabinet including a first laser configured to produce a first individual laser beam when activated;

a first optical fiber operatively connected between the laser system in the cabinet and the HEL optical assembly in the laser payload module; and wherein the first individual laser beam is transmitted through the first optical fiber into the HEL optical assembly when the laser system is activated.

4. The HEL weapon system of claim 3, wherein the laser system further comprises:

a second laser configured to produce a second individual laser beam when activated;

a second optical fiber operatively connected between the laser system in the cabinet and the HEL optical assembly in the laser payload module; and wherein the second individual laser beam is transmitted through the second optical fiber into the HEL optical assembly when the laser system is activated.

5. The HEL weapon system of claim 4, wherein the HEL optical assembly includes a laser combiner, wherein the respective individual laser beams transmitted through the respective optical fibers to the HEL optical assembly are combined into a single output HEL beam by the laser combiner.

6. The HEL weapon system of claim 5, wherein, when energized by the control signals, the HEL fast steering mirror reflects the output HEL beam along an aiming axis having a dynamic offset relative to the null axis, wherein the dynamic offset has a magnitude and a direction resulting from the control signals.

7. The HEL weapon system of claim 6, further comprising:

a control screen configured to display a field of view in a digital image frame received from the first camera;

wherein the field of view includes a plurality of images;

wherein a first reference point in the digital image frame corresponds in a first predetermined relationship to the pointing axis of the payload assembly;

a human machine interface (HMI) configured to designate one of the plurality of images as a target image;

a machine vision processor configured to determine a first offset distance and a first offset direction measured from the first reference point to the target image in the digital image frame;

a gimbal control system configured to receive the first offset distance and first offset direction from the machine vision processor;

send a gimbal steering command to move the payload assembly and pointing axis in a direction corresponding to the first offset direction; and send a gimbal speed command to move the payload assembly at a speed proportional to the first offset distance.

8. The HEL weapon system of claim 7, further comprising:

a laser control system configured to receive the first offset distance and first offset direction from the machine vision processor and to adjust the first offset distance and first offset direction according to the second predetermined offset between the pointing axis and the null axis to produce a modified first offset distance and a modified first offset direction; and a mirror controller configured to receive the modified first offset distance and a modified first offset direction and output mirror control signals to energize the fast steering mirror to reflect the single output laser beam along the aiming axis with a dynamic offset relative to the null axis that has a magnitude and a direction corresponding to the modified first offset distance and the modified first offset direction.

9. The HEL weapon system of claim 8, wherein the machine vision processor is further configured:

to track the target image and to periodically determine an updated first offset distance and an updated first offset direction measured from the first reference point to the target image in the digital image frame;

wherein the gimbal control system is configured to send an updated gimbal steering command and an updated gimbal speed command upon receiving the updated first offset distance and the updated first offset direction; and wherein the laser control system is configured to calculate and send an updated modified first offset distance and an updated modified first offset direction upon receiving the updated first offset distance and the updated first offset direction.

10. The HEL weapon system of claim 7, further comprising:

a command, control, and communications (C3S) module configured to receive track information from external C3S assets and to communicate with the control screen;

wherein the control screen is configured to display a plurality of digital icons in the field of view based on track information received from the C3S module;

wherein the human machine interface (HMI) is configured to designate one of the plurality of digital icons as the target image; and wherein the machine vision processor is configured to regard the target image based on a digital icon in a similar manner a target image based on an image.

11. The HEL weapon system of claim 7, further comprising:

an artificial intelligence (AI) system operatively connected to the machine vision processor and to and the control screen;

wherein the AI system can determine a respective threat probability for each respective image in the field of view based on multi-factor threat attributes including appearance data obtained from the digital image frame;

wherein the AI system can rank the respective threat probabilities; and wherein the AI system can display a target cue indicator over the respective image corresponding to the highest ranked respective threat probability.

12. The HEL weapon system of claim 11, wherein the AI system is a part of an integrated electronic warfare system; and wherein at least some of the multi-factor threat attributes used by the AI system to determine the respective threat probability of each respective image are received from a radar subsystem.

13. A method of aiming a high energy laser (HEL) weapon system, comprising:

establishing a field of view in a digital image frame received from a camera system, wherein a reference point in the digital image frame corresponds in a first predetermined relationship to an optical axis of the camera system;

designating a target image in the field of view of the digital image frame;

determining an offset distance and an offset direction measured from the reference point to the target image in the digital image frame; and producing a steering command input based on the offset distance and the offset direction measured from the reference point to the target image in the digital image frame; and providing the steering command input to an HEL fast steering mirror of an HEL laser optical assembly to deflect the HEL fast steering mirror to a position, wherein deflecting the HEL fast steering mirror deflects a pointing axis of the HEL laser optical assembly by an angle proportional to the offset distance.

14. The method of aiming a HEL weapon system of claim 13, further comprising tracking the target image;

periodically determining an updated first offset distance and an updated first offset direction measured from a first reference point to the target image in the digital image frame;

sending an updated gimbal steering command and an updated gimbal speed command upon receiving the updated first offset distance and the updated first offset direction; and determining and sending an updated modified first offset distance and an updated modified first offset direction upon receiving the updated first offset distance and the updated first offset direction.

15. The method of aiming a HEL weapon system of claim 13, further comprising:

receiving track information from external C3S assets;

communicating with a control screen to display a plurality of digital icons in the field of view based on the track information;

designating one of the plurality of digital icons as the target image; and regarding the target image based on a digital icon in a similar manner a target image based on an image.

16. The method of aiming a HEL weapon system of claim 15, further comprising:

determining a respective threat probability for each respective image in the field of view based on multi-factor threat attributes including appearance data obtained from the digital image frame;

ranking the respective threat probabilities; and displaying a target cue indicator over the respective image corresponding to the highest ranked respective threat probability.

17. A high energy laser (HEL) weapon system comprising:

a base;

a gimbal comprising first portion and a second portion, the first portion rotatably mounted to the base;

a payload assembly rotatably mounted to the second portion of the gimbal, the payload comprising a HEL optical assembly and a camera;

a control screen configured to display a field of view in a digital image frame received from the camera, the field of view comprising a plurality of images, wherein a first reference point in the digital image frame corresponds in a first predetermined relationship to a pointing axis of the payload assembly;

a human machine interface (HMI) configured to designate one of the plurality of images as a target image;

a machine vision processor configured to determine a first offset distance and a first offset direction measured from the first reference point to the target image in the digital image frame;

a gimbal control system configured to:

receive the first offset distance and first offset direction from the machine vision processor;

send a gimbal steering command to move the payload assembly and pointing axis in a direction corresponding to the first offset direction; and send a gimbal speed command to move the payload assembly at a speed proportional to the first offset distance.

18. The HEL weapon system of claim 17, further comprising:

a laser control system configured to receive the first offset distance and first offset direction from the machine vision processor and to adjust the first offset distance and first offset direction according to a second predetermined offset between the pointing axis and a null axis to produce a modified first offset distance and a modified first offset direction; and a mirror controller configured to receive the modified first offset distance and a modified first offset direction and output mirror control signals to energize a fast steering mirror to reflect an output laser beam along an aiming axis with a dynamic offset relative to the null axis that has a magnitude and a direction corresponding to the modified first offset distance and the modified first offset direction.

19. The HEL weapon system of claim 18, wherein the machine vision processor is further configured:

to track the target image and to periodically determine an updated first offset distance and an updated first offset direction measured from the first reference point to the target image in the digital image frame;

wherein the gimbal control system is configured to send an updated gimbal steering command and an updated gimbal speed command upon receiving the updated first offset distance and the updated first offset direction; and wherein the laser control system is configured to calculate and send an updated modified first offset distance and an updated modified first offset direction upon receiving the updated first offset distance and the updated first offset direction.

20. The HEL weapon system of claim 17, further comprising:

a command, control, and communications (C3S) module configured to receive track information from external C3S assets and to communicate with the control screen;

wherein the control screen is configured to display a plurality of digital icons in the field of view based on track information received from the C3S module;

wherein the human machine interface (HMI) is configured to designate one of the plurality of digital icons as the target image; and wherein the machine vision processor is configured to regard the target image based on a digital icon in a similar manner a target image based on an image.

21. The HEL weapon system of claim 17, further comprising:

an artificial intelligence (AI) system operatively connected to the machine vision processor and to and the control screen;

wherein the AI system can determine a respective threat probability for each respective image in the field of view based on multi-factor threat attributes including appearance data obtained from the digital image frame;

wherein the AI system can rank the respective threat probabilities; and wherein the AI system can display a target cue indicator over the respective image corresponding to the highest ranked respective threat probability.

* * * * *